(12) United States Patent
Chun et al.

(10) Patent No.: US 10,288,943 B2
(45) Date of Patent: May 14, 2019

(54) BLACK SEALANT COMPOSITION, DISPLAY DEVICE INCLUDING THE SAME, AND METHOD OF MANUFACTURING DISPLAY DEVICE

(71) Applicant: LG DISPLAY CO., LTD., Seoul (KR)

(72) Inventors: Changwoo Chun, Cheonan-si (KR); Jinwuk Kim, Goyang-si (KR); Byunggeol Kim, Paju-si (KR); Sungwoo Kim, Paju-si (KR); Kyungyeol Ryu, Incheon (KR)

(73) Assignee: LG DISPLAY CO., LTD., Seoul (KR)

( * ) Notice: Subject to any disclaimer, the term of this patent is extended or adjusted under 35 U.S.C. 154(b) by 665 days.

(21) Appl. No.: 14/087,757

(22) Filed: Nov. 22, 2013

(65) Prior Publication Data

US 2014/0147659 A1    May 29, 2014

(30) Foreign Application Priority Data

Nov. 23, 2012  (KR) .......................... 10-2012-0134050

(51) Int. Cl.
  G02F 1/1339 (2006.01)
  B29C 65/36 (2006.01)

(52) U.S. Cl.
  CPC ............ *G02F 1/1339* (2013.01); *B29C 65/36* (2013.01); *B29C 65/3604* (2013.01); *B29C 65/3608* (2013.01); *B29C 65/3612* (2013.01); *B32B 2310/12* (2013.01); *B32B 2457/202* (2013.01); *G02F 2202/16* (2013.01); *G02F 2202/36* (2013.01); *Y10T 428/25* (2015.01); *Y10T 428/254* (2015.01)

(58) Field of Classification Search
  CPC .. B29C 65/36; B29C 65/3604–65/3612; G02F 1/1339
  See application file for complete search history.

(56) References Cited

U.S. PATENT DOCUMENTS

| | | | | |
|---|---|---|---|---|
| 4,374,963 | A * | 2/1983 | Morgan | ............... C08F 283/10 |
| | | | | 427/386 |
| 5,548,026 | A * | 8/1996 | Jorissen | ................. C08G 59/32 |
| | | | | 525/113 |
| 2008/0292824 | A1* | 11/2008 | Haeger | ............... B29C 65/1425 |
| | | | | 428/36.92 |
| 2013/0000811 | A1* | 1/2013 | Engeldinger | .............. C09J 5/06 |
| | | | | 156/60 |

FOREIGN PATENT DOCUMENTS

| | | |
|---|---|---|
| CN | 1267891 A | 9/2000 |
| CN | 1962783 A | 5/2007 |
| KR | 10-2007-0046043 A | 5/2007 |

(Continued)

OTHER PUBLICATIONS

Frank et al., Development of a universal stress sensor for graphene and carbon fibers, Nature Communications 2, Article 255, Mar. 29, 2011, pp. 1-7.*

(Continued)

*Primary Examiner* — Elizabeth A Robinson
(74) *Attorney, Agent, or Firm* — Seed IP Law Group LLP (57) ABSTRACT

A black sealant composition includes magnetic nanoparticles including a core and a shell surrounding the core, conductive black particles having a black color, and a resin including the magnetic nanoparticles and the conductive black particles dispersed therein.

6 Claims, 8 Drawing Sheets

(56) References Cited

FOREIGN PATENT DOCUMENTS

KR    10-2008-0079866 A    9/2008
WO    WO 2011085874 A1 *  7/2011    ................ C09J 5/06

OTHER PUBLICATIONS

Oxford English Dictionary Resin definition, third edition Mar. 2010, Oxford University Press, pp. 1-12.*
Office Action dated Nov. 2, 2015 for corresponding Chinese Patent Application No. 201310598000.1, 9 pages.
Korean Office Action dated Feb. 25, 2019, for Korean Application No. 9-5-2019-013836838, 10 pages. (With English Translation).

* cited by examiner

BLACK SEALANT COMPOSITION, DISPLAY DEVICE INCLUDING THE SAME, AND METHOD OF MANUFACTURING DISPLAY DEVICE

BACKGROUND

Field of the Disclosure

Embodiments of the disclosure relates to a display device and a method of manufacturing the same. More particularly, the present invention relates to a display device including a black sealant and a method of manufacturing the display device.

Discussion of the Related Art

In general, a sealant includes various attachment portions such as an attachment portion between films, an attachment portion between an optical instrument and the film, and a side edge seal between the films in a material for a display. In a known liquid crystal display including a color filter substrate and a thin film transistor substrate, a technology including a double-sided tape type sealant including an acryl-based component and an epoxy component is applied to bond the thin film transistor substrate and the color filter substrate.

The double-sided tape type sealant is a type where the sealant is not applied but attached. Accordingly, defects such as disconnection of the sealant, non-injection, and a defect in injection amount do not occur. Further, since the uncured sealant is not provided, contamination of liquid crystal due to the uncured sealant does not occur and width uniformity of the sealant may be secured. In addition, since the process is not performed by radiating UV, a UV blocking mask does not need to be manufactured. Accordingly, a manufacturing cost may be reduced. Further, the double-sided tape type sealant includes a black pigment. Accordingly, light leakage defects occurring when a liquid crystal display is seen from a lateral surface may be removed.

However, the double-sided tape type sealant is in a trade off relationship where thermal curing should be typically performed at an application temperature range of 150 to 180° C. for about 1 hour for a sufficient curing ratio and the temperature should be typically increased to reduce a curing time.

Further, the double-sided tape type sealant is to be replaced by an acryl adhesive in order to reduce an attachment time even though a curing property is slightly poor. The acryl-based adhesive has an advantage in that the attachment time is fast even though curing strength is weak. Epoxy has a disadvantage in that the curing time reaches several hours but has high curing strength. Accordingly, a hybrid type sealant of the two adhesives is developed to secure the advantages of the two adhesives.

Examples of a method for fast curing without thermal curing include a method of performing curing within several tens seconds by using a UV curing system. However, there are disadvantages in that a curing system should be provided to perform UV curing and attachment is feasible only for a thickness and a position to which a light source is applied. However, since heat is not used, there is an advantage in that the UV curing system is capable of being applied to a portion that is weak to heat.

However, when a black pigment or dye is used to prevent light leakage of the light source such as a backlight unit, a UV light source is absorbed by light absorption of a black material to weaken the essence of the UV curing system. Accordingly, there is a disadvantage in that thermal curing should be performed like the related art. Therefore, there remains a need to develop a sealant capable of complementing the disadvantages of thermal curing of epoxy and UV curing of acryl.

SUMMARY

A black sealant composition includes magnetic nanoparticles including a core and a shell surrounding the core, conductive black particles having a black color, and a resin including the magnetic nanoparticles and the conductive black particles dispersed therein.

A display device includes a lower substrate and an upper substrate on which a display element is formed, and a black sealant attaching the lower substrate and the upper substrate, wherein the black sealant includes magnetic nanoparticles including a core and a shell surrounding the core, conductive black particles having a black color, and a resin including the magnetic nanoparticles and the conductive black particles dispersed therein.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EXEMPLARY EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

The present invention relates to a coloring enhancer for embodying a color reflection type display device and a display device including the same, and discloses the coloring enhancer included in each of a red reflection layer, a green reflection layer, and a blue reflection layer provided in the display device.

In the reflection layers, red, green, and blue color layers are formed, and a white color may be further included. Each reflection layer includes a separate colorant to embody the red, green, and blue colors among the colors. An organic pigment or dye having an anthraquinone, dipyrrolopyrrole, isoindolidone, azopyridone, azopyrrolidone, diazodiarylide, triarylmethane, phthalocyanine, quinophthalon, thioindigoid, thioxanthene, or xanthene group is used as the colorant.

A black sealant composition used in the display device of the present invention includes magnetic nanoparticles including a core and a shell surrounding the core, conductive black particles having a black color, and a resin including the magnetic nanoparticles and the conductive black particles dispersed therein.

Figure 1:
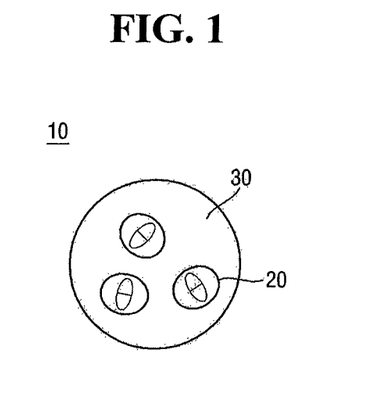
FIG. 1 is a view showing magnetic nanoparticles of the present invention.
Figure 2:
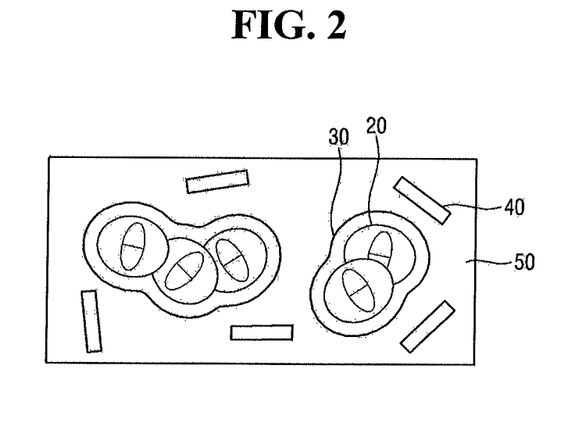
FIG. 2 is a view showing a black sealant composition of an embodiment of the present invention.
Figure 3:
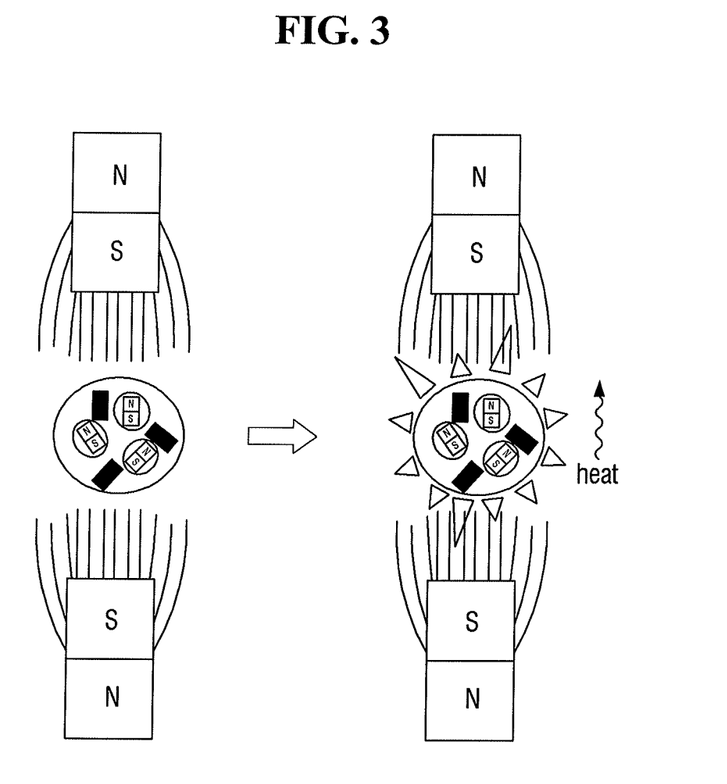
FIG. 3 is a mimetic view showing generation of heat by spinning of the magnetic nanoparticles.

FIG. 1 is a view showing the magnetic nanoparticles of the present invention. FIG. 2 is a view showing the black sealant composition of the present invention. FIG. 3 is a mimetic view showing generation of heat by spinning of the magnetic nanoparticles.

Referring to FIG. 1, a magnetic nanoparticle 10 of the present invention is formed of a core 20 and a shell 30 surrounding the core 20. The core 20 has superparamagnetism (SPM) in a nano-sized fine particle state, may be formed of one or more selected from the group consisting of iron (Fe), cobalt (Co), nickel (Ni), chrome (Cr), yttrium (Y), samarium (Sm), and gadolinium (Gd), and is formed of ferric oxide ($Fe_2O_3$) or triiron tetraoxide ($Fe_3O_4$) including a small amount of magnesium (Mg), copper (Cu), manganese (Mn), or zinc (Zn). Particularly, in the present invention, iron oxides may be representatively used in terms of easiness of manufacturing and obtaining. Preferably, iron oxides of maghemite ($\gamma$-$Fe_2O_3$) or magnetite ($Fe_3O_4$) may be used.

The superparamagnetism is a phenomenon that a state where magnetism is not present is maintained when there is no external magnetic field but the magnetism is secured during exposure to the external magnetic field. When a metal oxide magnetic substance is maintained at a level of ultra-fine particles having a size of 1 to 100 nm, the particles have the superparamagnetism. Accordingly, the particles behave as nanoscale magnets when the external magnetic field is applied. Meanwhile, in addition to the superparamagnetism, a magnetic substance classified into a ferromagnetic substance, an anti-ferromagnetic substance, and a ferrimagnetic substance according to a property and a structure of a material may be applied as the core 20 of the present invention. Preferably, the superparamagnetic core is applied.

The shell 30 surrounding the core 20 acts as an insulator preventing the magnetic substance of the core from being oxidized, maintaining a domain of the nanoparticles in a nano size, and minimizing an electric property of the magnetic substance, and acts as an encapsulation material not affected by the magnetic field. The shell 30 may be formed of one or more selected from the group consisting of zirconium oxide ($ZrO_2$), titanium oxide ($TiO_2$), aluminum oxide ($Al_2O_3$), cerium oxide ($CeO_2$), and silicon oxide ($SiO_2$). Particularly, in the present invention, silicon oxide ($SiO_2$) widely used as the material of the shell in a core-shell structure may be used as the material of the shell 30.

The content of the magnetic substance applied to the core 20 may be 5 to 100 wt %, but is not particularly limited. The magnetic nanoparticles and MWCNT of the core 20 may be dispersed in aqueous and alcohol systems and surrounded by silicon oxide ($SiO_2$) by a sol-gel method to manufacture the magnetic nanoparticle 10 where the core 20 is embedded in the shell 30 of silicon oxide ($SiO_2$).

The magnetic nanoparticle may be mixed with an adhesive resin to be used as a sealant. Referring to FIG. 2, the magnetic nanoparticles 10 of the present invention are mixed with a resin 50. An epoxy resin as a thermosetting resin having excellent adhesiveness and moisture proof may be used as the resin 50, and an acryl resin having an excellent curing property may be used. In the present invention, a mixture resin including the epoxy resin and the acryl resin mixed therein may be used. For example, the epoxy resin (ERL-4221 (3,4 epoxycyclohexylmethyl 3,4 epoxycyclohexyl carboxylate)) and a copolymer of methyl methacrylate-butyl methacrylate are typically mixed at an appropriate ratio depending on a curing time and a temperature, and used. Herein, in the mixture resin, the epoxy resin is mixed at a ratio of 50 to 90 parts by weight based on 100 parts by weight of the entire mixture resin, and the acryl resin is mixed as a balance. In the mixture resin, for example, 80% of the epoxy resin and 20% of the acryl resin are mixed.

Conductive black particles 40 are further mixed with the resin 50 mixed with the magnetic nanoparticles 10. The conductive black particles 40 are conductive materials having a black color, and conductive carbon black including carbon nanotube (CNT), graphene, and pigments having the black color may be used. Particularly, in the present invention, since the carbon nanotube is the most representative material having electric conductivity, thermal conductivity, and excellent mechanical strength, the carbon nanotube is used.

Accordingly, the black sealant composition of the present invention is formed by mixing the resin 50, the magnetic nanoparticles 10, and the carbon nanotube 40. Herein, the magnetic nanoparticles 10 are mixed in a content of 1 to 10 parts by weight based on 100 parts by weight of the entire black sealant composition. When the content of the magnetic nanoparticles 10 is 1 part by weight or more, heat for curing the resin is effectively generated to easily cure the resin. When the content of the magnetic nanoparticles 10 is 10 parts by weight or less, a reduction in adhesive strength of the black sealant composition is prevented. Further, the black conductive material 40 is mixed in a content of 1 to 10 parts by weight based on 100 parts by weight of the entire black sealant composition. When the content of the black conductive material 40 is 1 part by weight or more, heat for curing the resin is effectively transferred to the entire resin to easily cure the resin. When the content of the black conductive material 40 is 10 parts by weight or less, the reduction in adhesive strength of the black sealant composition is prevented.

In the black sealant composition of the present invention, the resin 50, the magnetic nanoparticles 10, and the carbon nanotube 40 are mixed. The black sealant composition is manufactured by manufacturing the magnetic nanoparticles 10 and then mixing the resin 50 and the carbon nanotube 40 at a predetermined ratio. Further, the magnetic nanoparticles 10 may be powderized and dispersed in the mixture resin 50 including the epoxy resin and the acryl resin mixed therein. However, a method of directly dispersing the magnetic nanoparticles 10 in monomers to perform polymerization may be applied. In addition to the aforementioned method, a method of directly introducing the carbon nanotube and the magnetic nanoparticles into the epoxy resin, the acryl resin, or the mixture resin including the epoxy resin and the acryl resin mixed at an appropriate ratio therein to perform dispersion for use is feasible.

In the black sealant composition of the present invention, the sealant may be thermally cured by using spinning and frictional heat of the magnetic nanoparticles by applying the magnetic field to the magnetic nanoparticles.

Referring to FIG. 3, when a superparamagnetic property is grafted onto the magnetic nanoparticles in the present invention, the magnetic field is formed through an AC electric field. When a direction of the electric field is changed, the direction of the magnetic field is changed. A pulse may be formed by a change speed of the electric field, and the intensity of the magnetic field may be adjusted through the intensity of the electric field. A magnetic moment of the magnetic nanoparticles is changed through the change of the direction of the electric field to spin the domain, causing frictional heat. Accordingly, heat is generated. Based on this principle, the thermosetting resin may be cured by causing frictional heat by spinning of the magnetic nanoparticles and transferring heat to a medium as the thermosetting resin through the carbon nanotube.

As described above, the black sealant composition of the present invention may prevent light leakage of a light source by using the black sealant to which the black conductive material is applied in the display device. Further, damage of the display device due to exposure to high heat over a long period of time may be prevented by applying the magnetic field to the magnetic nanoparticles to rapidly thermally cure the sealant by using spinning and frictional heat of the magnetic nanoparticles. Further, the black conductive material may effectively transfer generation heat of the magnetic nanoparticles to the resin to rapidly thermally cure the resin.

Figure 4:
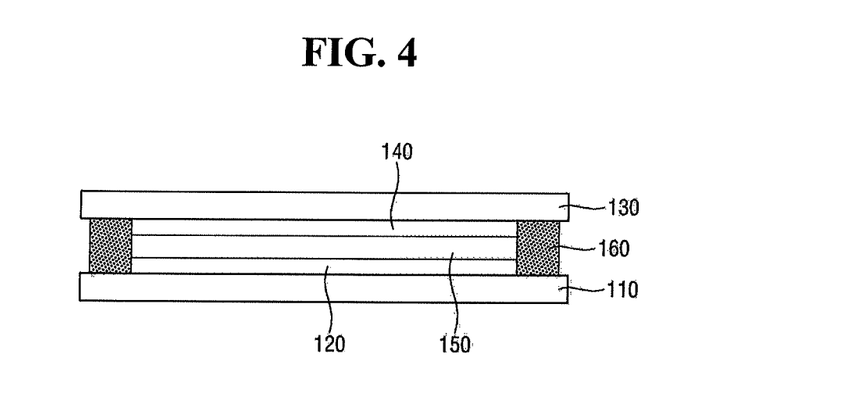
FIGS. 4 and 5 are cross-sectional views showing a display device according to an exemplary embodiment of the present invention.
Figure 5:
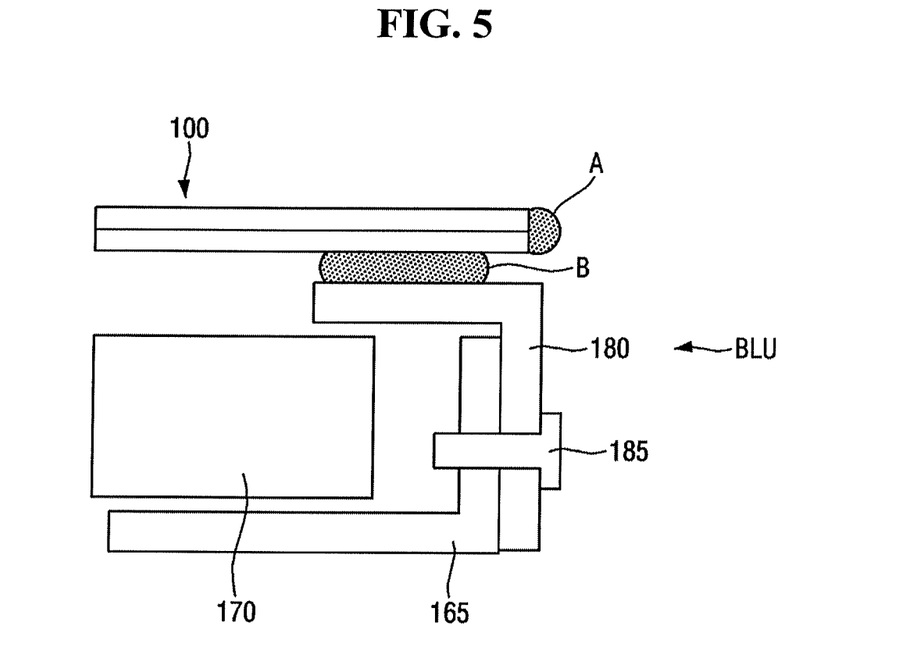

FIGS. 4 and 5 are cross-sectional views showing a display device according to an exemplary embodiment of the present invention. A liquid crystal display is described below as an example of the display device, but the display device is not limited thereto, and various types of display devices such as a plasma display and an organic light emitting display may be used.

Referring to FIG. 4, the display device according to the exemplary embodiment of the present invention includes a display panel including a lower substrate 110 on which a TFT array 120 is formed, an upper substrate 130 on which a color filter (CF) array 140 is formed, and a liquid crystal layer 150 interposed between the lower substrate 110 and the upper substrate 130. The black sealant composition of the present invention is used as a black sealant 160 applied between the lower substrate 110 and the upper substrate 130 to bond the lower substrate 110 and the upper substrate 130.

Further, referring to FIG. 5, the display panel 100 is equipped on a backlight unit BLU. The backlight unit BLU includes a light guide plate 170 receiving light from the light source to perform conversion into a surface light source, a bottom cover 165 in which the light guide plate 170 is equipped, a lateral surface cover 180 surrounding the lateral surface of the bottom cover 165, and a bolt 185 bolting the bottom cover 165 and the lateral surface cover 180.

The black sealant composition of the present invention is applied at a position B between the display panel 100 and the lateral surface cover 180 to attach and fix the display panel 100 to the lateral surface cover 180. Further, the black sealant composition is applied on a lateral surface position A of the display panel 100 to seal the lateral surface of the display panel 100.

The black sealant composition of the present disclosure bonds and seals the display panel 100 and attaches the display panel 100 and the lateral surface cover 180, and also is capable of being applied to any portion where the sealant is used in a semiconductor or display field.

Figure 6:
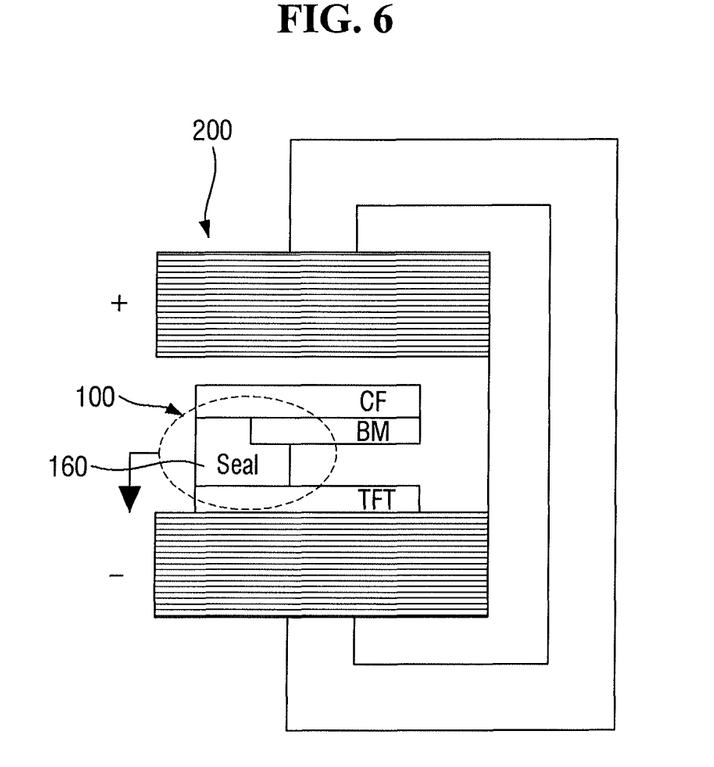
FIGS. 6 and 7 are views showing a high frequency alternating magnetic field for applying a magnetic field to the black sealant composition of embodiments of the present invention.
Figure 7:
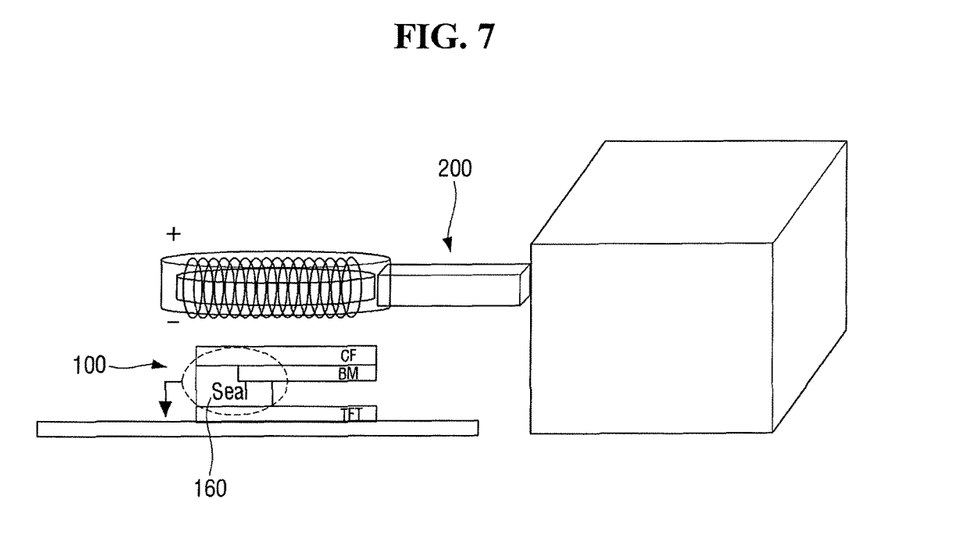

FIGS. 6 and 7 are views showing a high frequency alternating magnetic field for applying the magnetic field to the black sealant composition of the present disclosure.

The display panel 100 bonded by the black sealant formed by applying the black sealant composition of the present invention is subjected to a process of applying the magnetic field to the black sealant 160 to perform thermal curing.

Referring to FIG. 6, the display panel 100 bonded by the black sealant 160 may be situated between a +electromagnet (+) and a − electromagnet (−) of a high frequency alternating magnetic field 200 to change the direction of the magnetic field, causing frictional heat of the magnetic nanoparticles according to a change in direction of the magnetic moment. In this case, the high frequency alternating magnetic field may adjust a frequency of 100 to 500 kHz to apply the magnetic field. The black sealant may be cured within 10 to 200 sec through frictional heat of the magnetic nanoparticles.

Further, as shown in FIG. 7, frictional heat may be induced to the magnetic nanoparticles of the black sealant 160 while the direction of the magnetic field is changed through the high frequency alternating magnetic field 200 using a horizontal magnetic field by a coil. In the present invention, any device is capable of being used as long as the device is capable of inducing frictional heat of the magnetic nanoparticles in addition the high frequency alternating magnetic field device shown in FIGS. 6 and 7.

As described above, the black sealant used in the display device of the present invention may prevent damage of the display device due to exposure to high heat over a long period of time by applying the magnetic field to the magnetic nanoparticles to rapidly thermally cure the sealant by using spinning and frictional heat of the magnetic nanoparticles. Further, the black conductive material may effectively transfer generation heat of the magnetic nanoparticles to the resin to rapidly thermally cure the resin.

Hereinafter, a property of the black sealant composition of the present invention will be described in detail in the following Examples. However, the following Examples are set forth to illustrate but are not to be construed to limit the present invention.

EXAMPLE 1

40 g of the epoxy resin (3,4 epoxycyclohexylmethyl 3,4 epoxycyclohexyl carboxylate), 0.4 g of the magnetic nanoparticles, and 1 g of the multi-walled carbon nanotube (MWCNT) were mixed and homogenized in the glass beaker, and then homogenized for 15 minutes by the icing ultrasonic wave to manufacture the black sealant composition. The black sealant composition including the magnetic nanoparticles was uniformly attached to two glass rods, and tested under the magnetic field.

EXAMPLE 2

The black sealant composition was manufactured under the same process condition as Example 1, except that 0.8 g of the magnetic nanoparticles was used.

EXAMPLE 3

The black sealant composition was manufactured under the same process condition as Example 1, except that 1.2 g of the magnetic nanoparticles was used.

EXAMPLE 4

The black sealant composition was manufactured under the same process condition as Example 1, except that 2.0 g of the magnetic nanoparticles were used.

EXAMPLE 5

10 g of methyl methacrylate-butyl methacrylate copolymer, 40 g of the epoxy resin (3,4 epoxycyclohexylmethyl 3,4 epoxycyclohexyl carboxylate), 0.5 g of the magnetic nanoparticles, and 1 g of the multi-walled carbon nanotube (MWCNT) were mixed and homogenized in the glass beaker, and then homogenized for 15 minutes by the icing ultrasonic wave to manufacture the black sealant composition. The black sealant composition including the magnetic nanoparticles was uniformly attached to two glass rods, and tested under the magnetic field.

EXAMPLE 6

The black sealant composition was manufactured under the same process condition as Example 5, except that 1.0 g of the magnetic nanoparticles was used.

EXAMPLE 7

The black sealant composition was manufactured under the same process condition as Example 5, except that 1.5 g of the magnetic nanoparticles was used.

EXAMPLE 8

The black sealant composition was manufactured under the same process condition as Example 5, except that 2.0 g of the magnetic nanoparticles were used.

EXPERIMENT 1

The change in temperature of the black sealant composition was measured according to the time by applying the magnetic fields having the same intensity to the black sealant compositions manufactured according to Examples 1 to 4, and is shown in the following Table 1 and FIG. 8.

TABLE 1

| Example | Content % | Time s | | | | | | | | | | | | | | |
|---|---|---|---|---|---|---|---|---|---|---|---|---|---|---|---|---|
| | | 0 | 10 | 20 | 30 | 40 | 50 | 60 | 70 | 80 | 90 | 100 | 110 | 120 | 130 | 140 | 150 |
| 1 | 1 | 22 | 25 | 30 | 31 | 36 | 40 | 42 | 48 | 51 | 53 | 55 | 59 | 60 | 62 | 63 | 65 |
| 2 | 2 | 22 | 30 | 37 | 45 | 54 | 59 | 63 | 70 | 72 | 76 | 80 | 82 | 87 | 90 | 91 | 93 |
| 3 | 3 | 22 | 35 | 43 | 55 | 65 | 75 | 86 | 90 | 95 | 100 | 105 | 110 | 113 | 118 | 120 | 121 |
| 4 | 5 | 22 | 29 | 57 | 72 | 90 | 108 | 120 | 127 | 135 | 140 | 147 | 155 | — | — | — | — |

Figure 8:
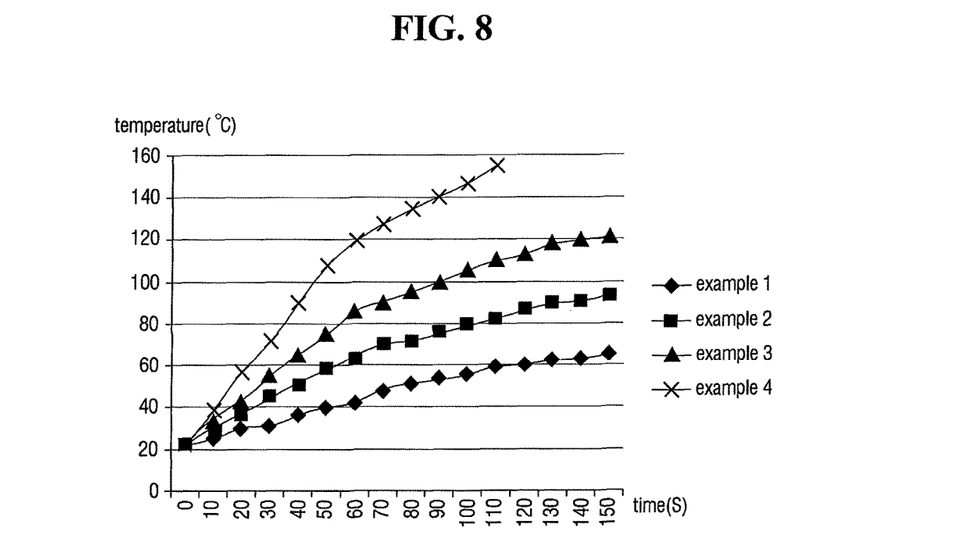
FIG. 8 is a graph shown by measuring a change in temperature of the black sealant composition according to a time by applying the magnetic fields having the same intensity to the black sealant compositions manufactured according to Examples 1 to 4 of the present invention.

Referring to Table 1 and FIG. 8, it was confirmed that the temperature of the black sealant composition was rapidly increased according to the time as the content of the magnetic nanoparticles in the black sealant composition was increased from 1% to 5%.

EXPERIMENT 2

The change in temperature of the black sealant composition was measured according to the time by changing the intensity of the magnetic field by the voltage with respect to the black sealant compositions manufactured according to Examples 1 to 4, and is shown in the following Table 2 and FIG. 9. (The change amount of the magnetic field was represented by % based on the initial intensity of the magnetic field.)

TABLE 2

| Example | Change amount % | Time s | | | | | | | | | | | | | | |
|---|---|---|---|---|---|---|---|---|---|---|---|---|---|---|---|---|
| | | 0 | 10 | 20 | 30 | 40 | 50 | 60 | 70 | 80 | 90 | 100 | 110 | 120 | 130 | 140 | 150 |
| 1 | 20 | 22 | 24 | 27 | 30 | 32 | 38 | 39 | 40 | 42 | 45 | 49 | 50 | 52 | 55 | 57 | 58 |
| 2 | 40 | 22 | 30 | 41 | 52 | 64 | 78 | 90 | 100 | 110 | 113 | 119 | 124 | 130 | 138 | 140 | 142 |
| 3 | 50 | 22 | 40 | 60 | 80 | 90 | 110 | 120 | 137 | 140 | 147 | 150 | — | — | — | — | — |
| 4 | 70 | 23 | 50 | 78 | 102 | 124 | 142 | 160 | — | — | — | — | — | — | — | — | — |

Figure 9:
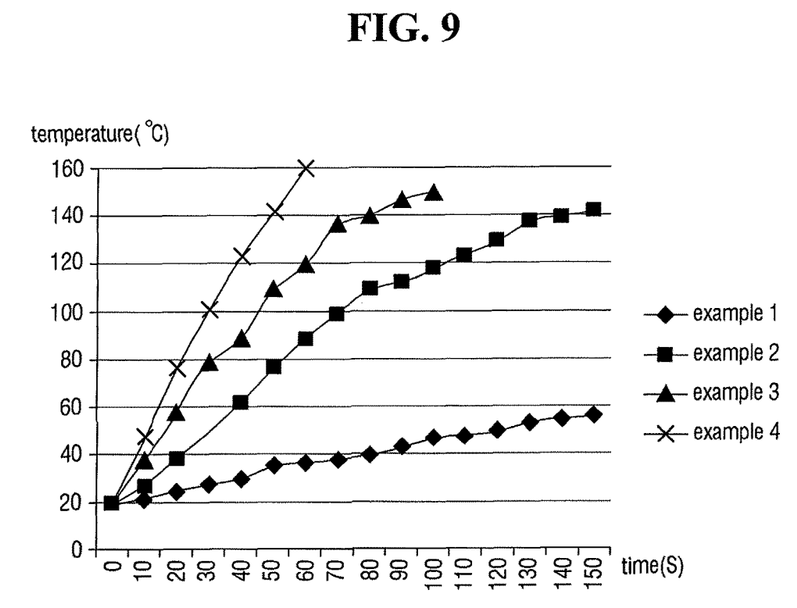
FIG. 9 is a graph shown by measuring the change in temperature of the black sealant composition according to the time by changing the intensity of the magnetic field by a voltage with respect to the black sealant compositions manufactured according to Examples 1 to 4 of the present invention.

Referring to Table 2 and FIG. 9, it was confirmed that the temperature of the black sealant composition was rapidly increased according to the time as the intensity of the magnetic field applied to the black sealant composition was increased from 20% to 70%.

EXPERIMENT 3

The change in temperature of the black sealant composition was measured according to the time by pulse-changing the intensity of the magnetic field with respect to the black sealant composition manufactured according to Example 4, and is shown in the following Table 3 and FIG. 10.

TABLE 3

| | | Time s | | | | |
|---|---|---|---|---|---|---|
| | | 0 | 10 | 20 | 30 | 40 |
| Hz change | 5 kw/240 khz | 20 | 60 | 85 | 118 | 144 |
| | 5 kw/280 khz | 20 | 80 | 125 | 170 | — |

Figure 10:
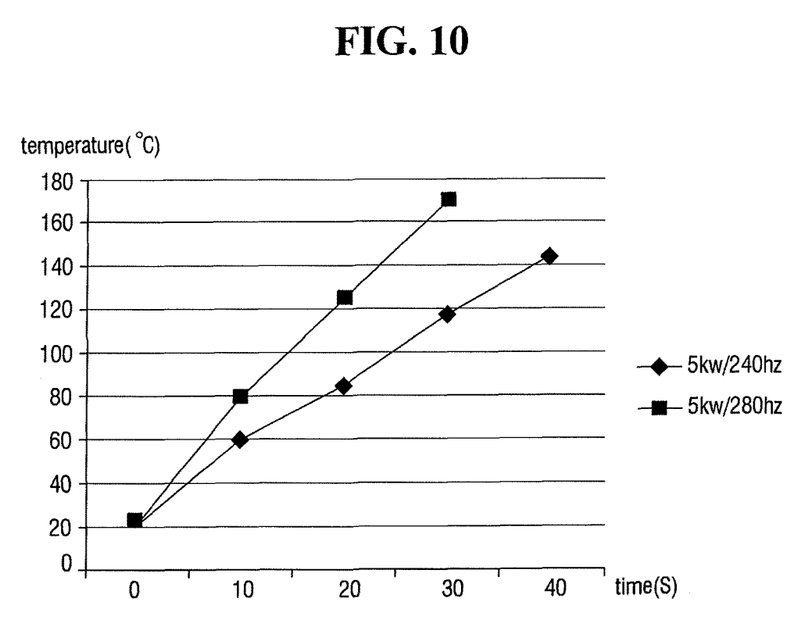
FIG. 10 is a graph shown by measuring the change in temperature of the black sealant composition according to the time by pulse-changing the intensity of the magnetic field with respect to the black sealant composition manufactured according to Example 4 of the present invention.

Referring to Table 3 and FIG. 10, it was confirmed that the temperature of the black sealant composition was rapidly increased according to the time as the intensity of the magnetic field applied to the black sealant composition was increased from 240 kHz to 280 kHz.

EXPERIMENT 4

The change in temperature of the black sealant composition was measured according to the time by applying the magnetic fields having the same intensity to the black sealant compositions manufactured according to Examples 5 to 8, and is shown in the following Table 4 and FIG. 11.

TABLE 4

| Example | Content % | Time s | | | | | | |
|---|---|---|---|---|---|---|---|---|
| | | 0 | 10 | 20 | 30 | 40 | 50 | 60 |
| 5 | 1 | 22 | 31 | 40 | 48 | 53 | 59 | 62 |
| 6 | 2 | 22 | 45 | 59 | 70 | 76 | 82 | 90 |
| 7 | 3 | 22 | 55 | 75 | 90 | 110 | 110 | 118 |
| 8 | 5 | 22 | 72 | 108 | 127 | 140 | 155 | 168 |

Figure 11:
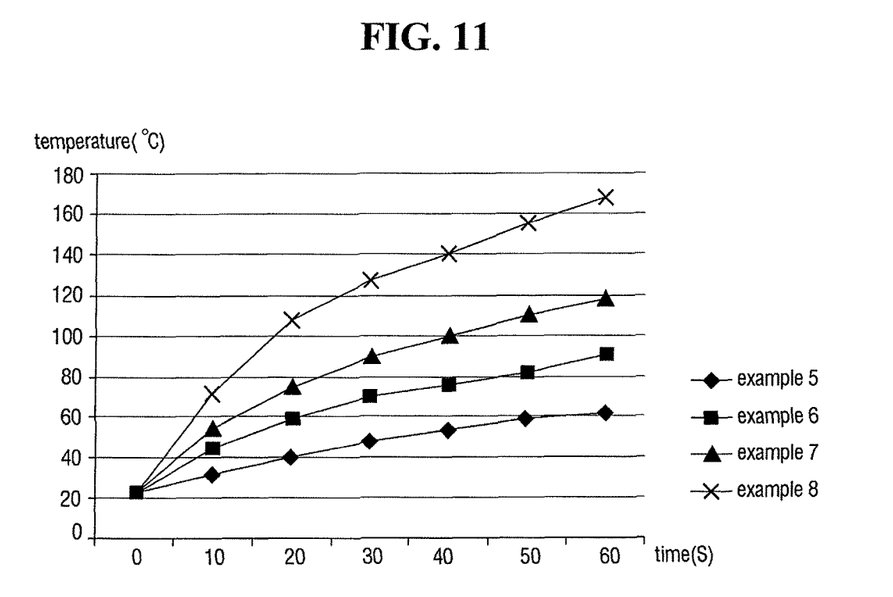
FIG. 11 is a graph shown by measuring the change in temperature of the black sealant composition according to the time by applying the magnetic fields having the same intensity to the black sealant compositions manufactured according to Examples 5 to 8 of the present invention.

Referring to Table 4 and FIG. 11, it was confirmed that the temperature of the black sealant composition was rapidly increased according to the time as the content of the magnetic nanoparticles in the black sealant composition was increased from 1% to 5%.

EXPERIMENT 5

The change in temperature of the black sealant composition was measured according to the time by changing the intensity of the magnetic field by the voltage with respect to the black sealant compositions manufactured according to Examples 5 to 8, and is shown in the following Table 5 and FIG. 12. (The change amount of the magnetic field was represented by % based on the initial intensity of the magnetic field.)

TABLE 5

| Example | Change amount % | Time s | | | | | | | |
|---|---|---|---|---|---|---|---|---|---|
| | | 0 | 10 | 20 | 30 | 40 | 50 | 60 | 70 |
| 5 | 20 | 22 | 24 | 27 | 30 | 32 | 38 | 39 | 40 |
| 6 | 40 | 22 | 30 | 41 | 52 | 64 | 78 | 90 | 100 |
| 7 | 50 | 22 | 40 | 60 | 80 | 90 | 110 | 120 | 137 |
| 8 | 70 | 23 | 50 | 78 | 102 | 124 | 142 | 160 | — |

Figure 12:
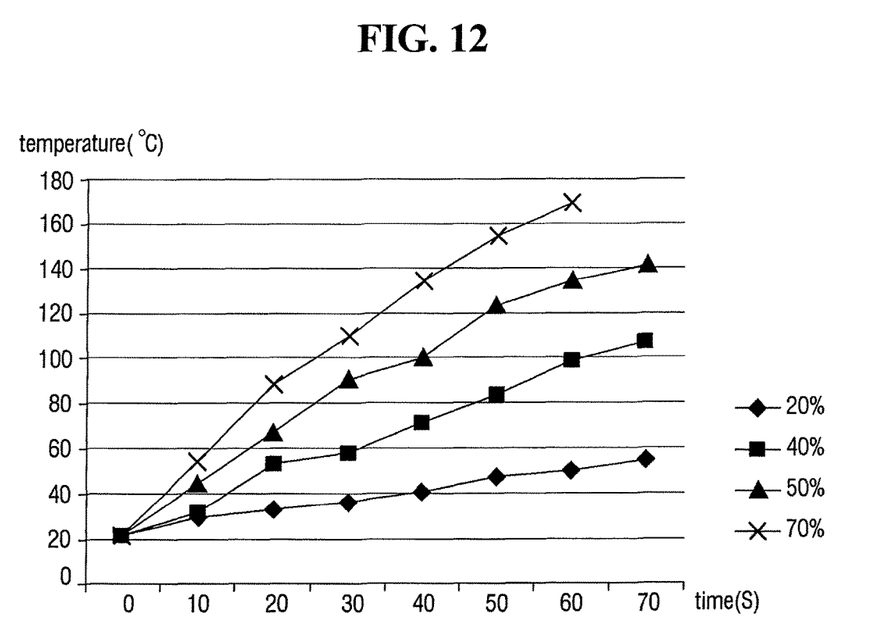
FIG. 12 is a graph shown by measuring the change in temperature of the black sealant composition according to the time by changing the intensity of the magnetic field by the voltage with respect to the black sealant compositions manufactured according to Examples 5 to 8 of the present invention.

Referring to Table 5 and FIG. 12, it was confirmed that the temperature of the black sealant composition was rapidly increased according to the time as the intensity of the magnetic field applied to the black sealant composition was increased from 20% to 70%.

EXPERIMENT 6

The change in temperature of the black sealant composition was measured according to the time by pulse-changing the intensity of the magnetic field with respect to the black sealant composition manufactured according to Example 8, and is shown in the following Table 6 and FIG. 13.

TABLE 6

| | | Time s | | | | |
|---|---|---|---|---|---|---|
| | | 0 | 10 | 20 | 30 | 40 |
| Hz change | 5 kw/240 khz | 20 | 66 | 95 | 132 | 154 |
| | 5 kw/280 khz | 20 | 90 | 142 | 184 | — |

Figure 13:
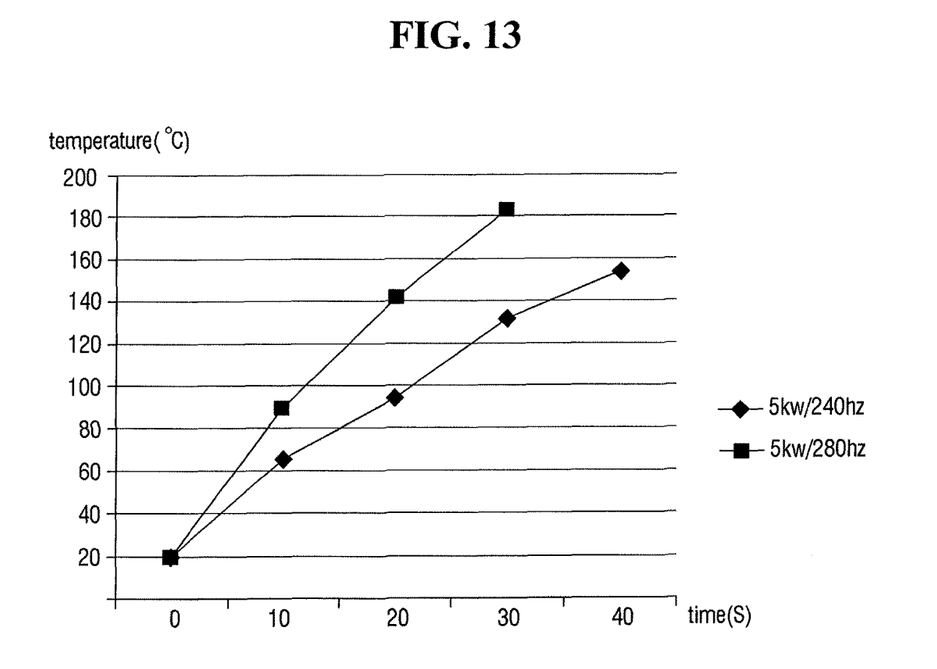
FIG. 13 is a graph shown by measuring the change in temperature of the black sealant composition according to the time by pulse-changing the intensity of the magnetic field with respect to the black sealant composition manufactured according to Example 8 of the present invention.

Referring to Table 6 and FIG. 13, it was confirmed that the temperature of the black sealant composition was rapidly increased according to the time as the intensity of the magnetic field applied to the black sealant composition was increased from 240 kHz to 280 kHz. Through Experiments 1 to 6, it can be seen that the approaching time to 140° C. is 45 sec when the content of the magnetic nanoparticles is 5%, 50 sec when the voltage is 70%, and 20 sec when the magnetic field pulse is 280 kHz, and similar UV curing times are shown.

As described above, the black sealant composition of the present invention, the display device including the same, and the method of manufacturing the display device have the following effects. First, the display device to which the black sealant is applied has an advantage in that a light leakage problem of leakage of light of the light source to the outside can be solved by securing the black color due to the black conductive material. Second, there is an advantage in that a damage problem of the display device due to exposure to high heat of a furnace over a long period of time to thermally cure the sealant in the related art can be solved by applying the magnetic field to the magnetic nanoparticles of the black sealant composition to rapidly thermally cure the sealant by using spinning and frictional heat of the magnetic nanoparticles. Third, there is an advantage in that the black conductive material can effectively transfer frictional heat of the magnetic nanoparticles to the entire sealant to rapidly thermally cure the sealant.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
  a display panel on a backlight unit, wherein the backlight unit includes a light guide plate, a bottom cover, and a lateral surface cover; and
  a black sealant including magnetic nanoparticles, conductive black particles, and a resin at a position between the display panel and the lateral surface cover to seal the display panel and the lateral surface cover,
  wherein the black sealant is further on a lateral surface of the display panel to seal the lateral surface of the display panel,
  and wherein the magnetic nanoparticles include a core and a shell surrounding the core, the conductive black particles comprise graphene having a black color, and the resin includes the magnetic nanoparticles and the conductive black particles dispersed therein; wherein the resin comprises about 80% by weight to about 90% by weight thermosetting epoxy resin and about 10% by weight to about 20% by weight acryl resin based on the total weight of the resin,
  wherein the black sealant is cured by using spinning and frictional heat of the magnetic nanoparticles,
  wherein the conductive black particles transfer heat generated by the magnetic nanoparticles to the resin to rapidly thermally cure the resin.

2. The display device of claim 1, wherein the core is formed of one or more selected from the group consisting of iron (Fe), cobalt (Co), nickel (Ni), chromium (Cr), yttrium (Y), samarium (Sm), gadolinium (Gd), and ferric oxide or triiron tetraoxide including a small amount of magnesium, copper, manganese or zinc.

3. The display device of claim 1, wherein the shell is formed of one or more compounds selected from the group consisting of zirconium oxide ($ZrO_2$), titanium oxide ($TiO_2$), aluminum oxide ($Al_2O_3$), cerium oxide ($CeO_2$), and silicon oxide ($SiO_2$).

4. A method of manufacturing a display device, comprising:
  arranging a display panel on a backlight unit, wherein the backlight unit includes including a light guide plate, a bottom cover, and a lateral surface cover;
  applying a black sealant including magnetic nanoparticles, conductive black particles, and a resin at a position between the display panel and the lateral surface cover to seal the display panel and the lateral surface cover;
  applying the black sealant further to a lateral surface of the display panel to seal the lateral surface of the display panel;
  applying a magnetic field to the black sealant to spin the magnetic nanoparticles causing frictional heat; and
  curing the black sealant using frictional heat of the magnetic nanoparticles transferred by the conductive black particles to the resin,
  wherein the magnetic nanoparticles include a core and a shell surrounding the core, the conductive black particles comprise graphene having a black color, and the resin includes the magnetic nanoparticles and the conductive black particles dispersed therein; wherein the resin comprises about 80% by weight to about 90% by weight thermosetting epoxy resin by and about 10% by weight to about 20% by weight acryl resin based on the total weight of the resin.

5. The method of claim 4, wherein applying the magnetic field comprises applying a high frequency alternating magnetic field adjusted to a frequency of 100 to 500 kHz.

6. The method of claim 4, wherein the curing of the black sealant is performed within 10 to 200 sec.

* * * * *